United States Patent
Goel et al.

(10) Patent No.: US 10,666,372 B2
(45) Date of Patent: May 26, 2020

(54) PRECISION TIME PROTOCOL OVER CELLULAR

(71) Applicant: QUALCOMM Incorporated, San Diego, CA (US)

(72) Inventors: Satashu Goel, San Diego, CA (US); Peerapol Tinnakornsrisuphap, San Diego, CA (US); Rajat Prakash, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/022,517

(22) Filed: Jun. 28, 2018

(65) Prior Publication Data
US 2019/0007151 A1    Jan. 3, 2019

Related U.S. Application Data

(60) Provisional application No. 62/527,605, filed on Jun. 30, 2017.

(51) Int. Cl.
*H04J 3/06* (2006.01)
*H04B 7/08* (2006.01)
(Continued)

(52) U.S. Cl.
CPC .......... *H04J 3/0667* (2013.01); *H04B 7/0857* (2013.01); *H04J 3/0682* (2013.01);
(Continued)

(58) Field of Classification Search
CPC combination set(s) only.
See application file for complete search history.

(56) References Cited

U.S. PATENT DOCUMENTS

| | | | |
|---|---|---|---|
| 2011/0200051 A1* | 8/2011 | Rivaud | H04J 3/0641 370/400 |
| 2013/0034197 A1* | 2/2013 | Aweya | H04J 3/0664 375/362 |

(Continued)

FOREIGN PATENT DOCUMENTS

WO    WO-2017054891 A1    4/2017

OTHER PUBLICATIONS

Garner G M., "Use of IEEE 1588 Best Master Clock Algorithm in IEEE 802.1AS; as-garner-use-of-bmc-061114", IEEE Draft; As-Garner-Use-Of-BMC-061114, IEEE-SA, Piscataway, NJ USA, vol. 802.1, Nov. 13, 2006 (Nov. 13, 2006), pp. 1-15, XP017641045, [retrieved on Nov. 13, 2006].

(Continued)

*Primary Examiner* — Yee F Lam
(74) *Attorney, Agent, or Firm* — Holland & Hart LLP

(57) ABSTRACT

Methods, systems, and devices for wireless communication are described. A user equipment (UE) may obtain a timing synchronization signal from a base station over a cellular wireless communication link. The UE may configure, based at least in part on the timing synchronization signal, a timer function of the UE as a precision time protocol (PTP) server. The UE may configure a PTP announce message based on the timer function and, in some examples, one or more metrics of the cellular wireless communication link. The UE may transmit the PTP announce message over a local communication network.

18 Claims, 11 Drawing Sheets

(51) Int. Cl.
*H04W 56/00* (2009.01)
*H04W 84/18* (2009.01)

(52) U.S. Cl.
CPC ... *H04W 56/0015* (2013.01); *H04W 56/0055* (2013.01); *H04J 3/0641* (2013.01); *H04W 84/18* (2013.01)

(56) References Cited

U.S. PATENT DOCUMENTS

| | | | | |
|---|---|---|---|---|
| 2013/0227008 | A1* | 8/2013 | Yang | G06F 1/12 709/204 |
| 2013/0227172 | A1* | 8/2013 | Zheng | H04J 3/0641 709/248 |
| 2014/0226984 | A1* | 8/2014 | Roberts | H04B 10/27 398/66 |
| 2015/0071309 | A1* | 3/2015 | Aweya | H04J 3/0682 370/503 |
| 2015/0092797 | A1* | 4/2015 | Aweya | H04J 3/0667 370/516 |
| 2015/0222413 | A1* | 8/2015 | Pietilainen | G06F 1/14 709/248 |
| 2016/0013876 | A1* | 1/2016 | Zhang | H04J 3/0667 370/350 |
| 2016/0020863 | A1* | 1/2016 | Kim | G07C 5/006 701/32.7 |
| 2016/0073365 | A1* | 3/2016 | Klockar | H04W 56/001 370/503 |
| 2016/0094335 | A1* | 3/2016 | Roberts | H04L 7/04 375/356 |
| 2016/0149692 | A1* | 5/2016 | Kim | H04L 12/4625 370/503 |
| 2016/0277138 | A1* | 9/2016 | Garg | H04L 41/0668 |
| 2016/0380749 | A1* | 12/2016 | Jose | H04L 7/0008 709/248 |
| 2018/0013508 | A1* | 1/2018 | Rabinovich | H04J 3/0667 |
| 2018/0062780 | A1* | 3/2018 | Shimizu | H04J 3/0667 |
| 2018/0152286 | A1* | 5/2018 | Kemparaj | H04L 7/0012 |
| 2019/0190635 | A1* | 6/2019 | Goel | H04W 56/0015 |

OTHER PUBLICATIONS

Mazur D C., et al., "Time Synchronization Mechanisms for the Industrial Marketplace", 2015 IEEE/IAS 51st Industrial & Commercial Power Systems Technical Conference (I&CPS), IEEE, May 5, 2015 (May 5, 2015), pp. 1-7, XP033206383, DOI: 10.1109/ICPS.2015.7266440, [retrieved on Sep. 14, 2015].
International Search Report and Written Opinion—PCT/US2018/040400—ISA/EPO—Oct. 16, 2018.

\* cited by examiner

PRECISION TIME PROTOCOL OVER CELLULAR

CROSS REFERENCES

The present Application for Patent claims the benefit of U.S. Provisional Patent Application No. 62/527,605 by GOEL, et al., entitled "PRECISION TIME PROTOCOL OVER CELLULAR," filed Jun. 30, 2017, assigned to the assignee hereof, and expressly incorporated herein.

BACKGROUND

The following relates generally to wireless communication, and more specifically to the use of precision time protocol (PTP) with cellular networks.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

Local communication networks may include industrial machines, automated functions, and the like, which rely on PTP (or similar techniques) to ensure that the machines are synchronized for operations. PTP may be implemented in such systems over an Ethernet network to synchronize the operations and movements of the machines. Implementation of PTP may include dedicated hardware support for deterministic delay calculations (e.g., estimation of the round-trip delay of packets in the local communication network using an Ethernet switch, etc.). Such systems, however, do not conventionally rely on wireless communication systems.

SUMMARY

The described techniques relate to improved methods, systems, devices, or apparatuses that support the use of PTP with cellular networks. Generally, the described techniques provide for time synchronization over a cellular link. For example, a UE may be configured to communicate over a wireless communication network and a local communication network. The UE may obtain a time synchronization signal from a base station (e.g., via a synchronization signal, information block, etc.) and synchronize timer function(s) of the UE between the cellular modem and the Ethernet hardware. Accordingly, the UE may function as a PTP server (e.g., Grandmaster clock source). The UE may modify parameter(s) and/or field(s) of a PTP announce message to carry or otherwise convey information indicating that the timing synchronization information being provided includes timing information obtained via a wireless communication network (e.g., information associated with the wireless link). In some aspects, the UE may adopt a priority level that sets a local PTP server (when available) as the primary PTP server and the UE as a secondary PTP server. In the situation where the PTP server operating on the local communication network becomes unavailable, the UE may act as the PTP server for the local communication network.

A method of wireless communication is described. The method may include obtaining, by a UE, a timing synchronization signal from a base station over a cellular wireless communication link, configuring, based at least in part on the timing synchronization signal, a timer function of the UE as a PTP server, configuring a PTP announce message based on the timer function and, in some examples, one or more metrics of the cellular wireless communication link, and transmitting the PTP announce message over a local communication network.

An apparatus for wireless communication is described. The apparatus may include means for obtaining, by a UE, a timing synchronization signal from a base station over a cellular wireless communication link, means for configuring, based at least in part on the timing synchronization signal, a timer function of the UE as a PTP server, means for configuring a PTP announce message based on the timer function and, in some examples, one or more metrics of the cellular wireless communication link, and means for transmitting the PTP announce message over a local communication network.

Another apparatus for wireless communication is described. The apparatus may include a processor, memory in electronic communication with the processor, and instructions stored in the memory. The instructions may be operable to cause the processor to obtain, by a UE, a timing synchronization signal from a base station over a cellular wireless communication link, configure, based at least in part on the timing synchronization signal, a timer function of the UE as a PTP server, configure a PTP announce message based on the timer function and, in some examples, one or more metrics of the cellular wireless communication link, and transmit the PTP announce message over a local communication network.

A non-transitory computer readable medium for wireless communication is described. The non-transitory computer-readable medium may include instructions operable to cause a processor to obtain, by a UE, a timing synchronization signal from a base station over a cellular wireless communication link, configure, based at least in part on the timing synchronization signal, a timer function of the UE as a PTP server, configure a PTP announce message based on the timer function and, in some examples, one or more metrics of the cellular wireless communication link, and transmit the PTP announce message over a local communication network.

Some examples of the method, apparatus, and non-transitory computer-readable medium described above may further include processes, features, means, or instructions for determining that no other PTP server exists on the local communication network. Some examples of the method, apparatus, and non-transitory computer-readable medium described above may further include processes, features, means, or instructions for configuring the timer function of the UE as a PTP server may be in response to the determination.

In some examples of the method, apparatus, and non-transitory computer-readable medium described above, configuring the PTP announce message comprises: setting a grandmaster priority of the UE to a priority value that may be lower than a priority value associated with a second PTP server operating on the local communication network.

Some examples of the method, apparatus, and non-transitory computer-readable medium described above may further include processes, features, means, or instructions for providing a timing signal over the local communication network according to the timer function of the UE.

In some examples of the method, apparatus, and non-transitory computer-readable medium described above, configuring the PTP announce message comprises: determining that at least one of the one or more metrics of the cellular wireless communication link satisfies a threshold. Some examples of the method, apparatus, and non-transitory computer-readable medium described above may further include processes, features, means, or instructions for configuring at least one of: a server accuracy field of the PTP announce message or a server class field of the PTP announce message based at least in part on the determination.

In some examples of the method, apparatus, and non-transitory computer-readable medium described above, the metrics of the cellular wireless communication link comprise at least one of: a received signal reference power (RSRP), a signal-to-noise ratio (SNR), a signal-to-interference-and-noise ratio (SINR), a received signal reference quality (RSRQ), a bandwidth parameter, a throughput parameter, or a combination thereof.

Some examples of the method, apparatus, and non-transitory computer-readable medium described above may further include processes, features, means, or instructions for obtaining the timing synchronization signal from the base station using at least one of: a primary synchronization signal, a secondary synchronization signal, a system information block, a positioning reference signal, or any combination thereof.

Some examples of the method, apparatus, and non-transitory computer-readable medium described above may further include processes, features, means, or instructions for configuring a time source field of the PTP announce message to indicate that the timing synchronization signal may be based on the cellular wireless communication link.

Some examples of the method, apparatus, and non-transitory computer-readable medium described above may further include processes, features, means, or instructions for synchronizing a cellular modem timer of the UE based at least in part on a timing signal obtained over the local communication network.

DETAILED DESCRIPTION

Precision Time Protocol (PTP) techniques may specify a variety of different clock types, e.g., Ordinary clock, Boundary clock, etc. In some aspects, a particular clock type may maintain a separate copy of a PTP state machine for each port. The state machine may be based on data comparison from different clocks. PTP techniques may include a delay response mechanism where delay request-response messages are exchanged to identify timing offsets from the master time at each device. The request-response exchange may identify the transit delays (e.g., the time between message transmission and message reception) and, in the instance where there is an intermediary device acting as a Transparent clock, the residence time (e.g., the time between when the intermediary device receives a message and when the intermediary device relays the message). Implementation of PTP techniques in a cellular link where a user equipment (UE) acts as the PTP clock, however, may be determined based on the link characteristics.

Aspects of the disclosure are initially described in the context of a wireless communications system. A UE may act as a PTP clock. The UE may obtain timing information from a base station (e.g., from a Grandmaster clock that is connected to the base station) via a synchronization signal, an information block, etc. The UE may configure timer configure/synchronize timer function(s) on the UE (e.g., the Ethernet modem timer function(s) and the cellular modem timer function(s)) as a PTP server and provide a timing synchronization signal over the local communication network (e.g., the Ethernet or local area network (LAN)). In some aspects, PTP server of the UE may configure PTP related messages (e.g., PTP announce messages) according to the timer function(s) and/or the parameters of the wireless communication network, e.g., link metric(s) such as interference levels, signal strength, etc. In some aspects, the UE may set a priority level as a secondary PTP server (e.g., to allow PTP server operating on the local communication network to act as the primary PTP server). In some aspects, the UE may transmit the PTP announce message to device(s) operating on the Ethernet.

Aspects of the disclosure are further illustrated by and described with reference to apparatus diagrams, system diagrams, and flowcharts that relate to the use of PTP with cellular networks.

Figure 1:
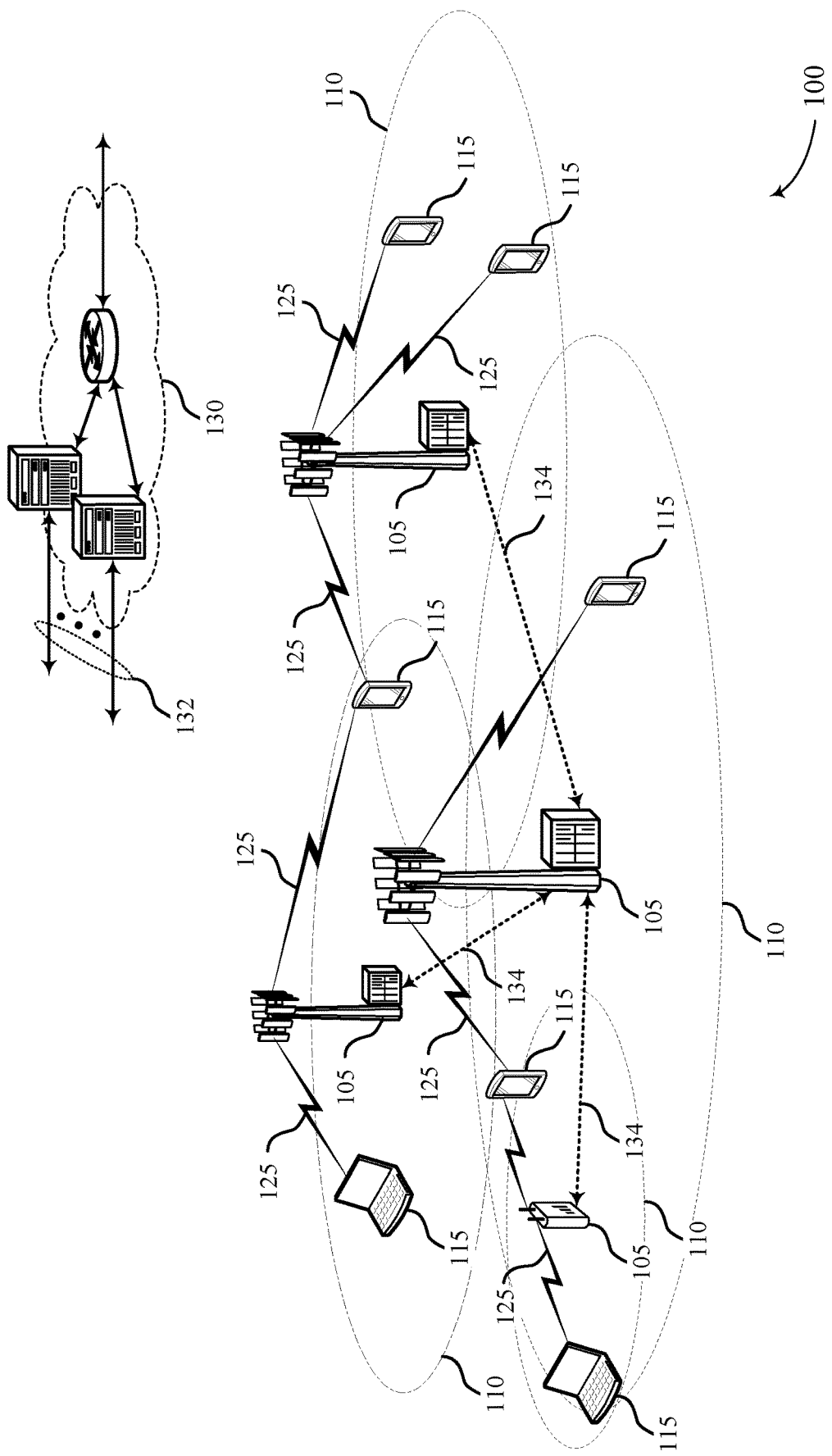
FIG. 1 illustrates an example of a system for wireless communication that supports the use of PTP with cellular networks. in accordance with aspects of the present disclosure.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE), LTE-Advanced (LTE-A) network, or a New Radio (NR) network. In some cases, wireless communications system 100 may support enhanced broadband communications, ultra-reliable (i.e., mission critical) communications, low latency communications, and communications with low-cost and low-complexity devices. In some aspects, wireless communications system 100 may include one or more aspects of a local communication network (e.g., an Ethernet, LAN, etc.). A UE 115 may be configured to communicate both on the wireless communication network (e.g., communicate with base station 105 and/or other UEs 115 via a wireless link) and with device(s) operating on a local communication link and with wired communication network (e.g., communicate with devices connected to an Ethernet LAN). The UE 115 may be configured to act as a PTP server on the local communication network. For example, the UE 115 may obtain a timing synchronization signal from a base station 105 over a cellular wireless communication link. The UE 115 may configure, based at least in part on the timing synchronization signal, a timer function of the UE as a PTP server. The UE 115 may configure a PTP announce message based on the timer function and one or more metrics of the cellular wireless communication link. The UE 115 may transmit the PTP announce message over a local communication network.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of Things (IoT) device, an Internet of Everything (IoE) device, a machine type communication (MTC) device, an appliance, an automobile, or the like.

In some cases, a UE 115 may also be able to communicate via a local communication network (e.g., using Institute of Electrical and Electronics Engineers (IEEE) protocols). For example, the UE 115 may include wireless modem(s) and local modem(s) that monitor and/or manage one or more aspects of communications over the wireless and local communication networks, respectively.

In some cases, a UE 115 may also be able to communicate directly with other UEs (e.g., using a peer-to-peer (P2P) or device-to-device (D2D) protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communications system may be configured to provide ultra-reliable communications for these functions.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as evolved NodeBs (eNBs) 105.

A base station 105 may be connected by an S1 interface to the core network 130. The core network may be an evolved packet core (EPC), which may include at least one mobility management entity (MME), at least one serving gateway (S-GW), and at least one Packet Data Network (PDN) gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service.

The core network 130 may provide user authentication, access authorization, tracking, IP connectivity, and other access, routing, or mobility functions. At least some of the network devices, such as base station 105 may include subcomponents such as an access network entity, which may be an example of an access node controller (ANC). Each access network entity may communicate with a number of UEs 115 through a number of other access network transmission entities, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate in an ultra-high frequency (UHF) frequency region using frequency bands from 700 MHz to 2600 MHz (2.6 GHz), although some networks (e.g., a wireless local area network (WLAN)) may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Thus, wireless communications system 100 may support millimeter wave (mmW) communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g., a base station 105) to shape and/or steer an overall antenna beam in the direction of a target receiver (e.g., a UE 115). This may be achieved by combining elements in an antenna array in such a way that transmitted signals at particular angles experience constructive interference while others experience destructive interference.

Multiple-input multiple-output (MIMO) wireless systems use a transmission scheme between a transmitter (e.g., a base station 105) and a receiver (e.g., a UE 115), where both transmitter and receiver are equipped with multiple antennas. Some portions of wireless communications system 100 may use beamforming. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). A mmW receiver (e.g., a UE 115) may try multiple beams (e.g., antenna subarrays) while receiving the synchronization signals.

In some cases, the antennas of a base station 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may multiple use antennas or antenna arrays to conduct beamforming operations for directional communications with a UE 115.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid ARQ (HARD) to provide retransmission at the MAC layer to improve link efficiency. In the control plane, the Radio Resource Control (RRC) protocol layer may provide establishment, configuration, and maintenance of an RRC connection between a UE 115 and a network device or core network 130 supporting radio bearers for user plane data. At the Physical (PHY) layer, transport channels may be mapped to physical channels.

Time intervals in LTE or NR may be expressed in multiples of a basic time unit (which may be a sampling period of $T_s=1/30,720,000$ seconds). Time resources may be organized according to radio frames of length of 10 ms ($T_f=307200T_s$), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases the subframe may be the smallest scheduling unit, also known as a TTI. In other cases, a TTI may be shorter than a subframe or may be dynamically selected (e.g., in short TTI bursts or in selected component carriers using short TTIs).

A resource element may consist of one symbol period and one subcarrier (e.g., a 15 KHz frequency range). A resource block may contain 12 consecutive subcarriers in the frequency domain and, for a normal cyclic prefix in each OFDM symbol, 7 consecutive OFDM symbols in the time domain (1 slot), or 84 resource elements. The number of bits carried by each resource element may depend on the modulation scheme (the configuration of symbols that may be selected during each symbol period). Thus, the more resource blocks that a UE receives and the higher the modulation scheme, the higher the data rate may be.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

In some cases, wireless communications system 100 may utilize enhanced component carriers (eCCs). An eCC may be characterized by one or more features including: wider bandwidth, shorter symbol duration, shorter TTIs, and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 microseconds). A TTI in eCC may consist of one or multiple symbols. In some cases, the TTI duration (that is, the number of symbols in a TTI) may be variable.

A shared radio frequency spectrum band may be utilized in an NR shared spectrum system. For example, an NR shared spectrum may utilize any combination of licensed, shared, and unlicensed spectrums, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some cases, wireless communications system 100 may utilize both licensed and unlicensed radio frequency spectrum bands. For example, wireless communications system 100 may employ LTE License Assisted Access (LTE-LAA) or LTE Unlicensed (LTE U) radio access technology or NR technology in an unlicensed band such as the 5 Ghz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a CA configuration in conjunction with CCs operating in a licensed band. Operations in unlicensed spectrum may include downlink transmissions, uplink transmissions, or both. Duplexing in unlicensed spectrum may be based on frequency division duplexing (FDD), time division duplexing (TDD) or a combination of both.

Figure 2:
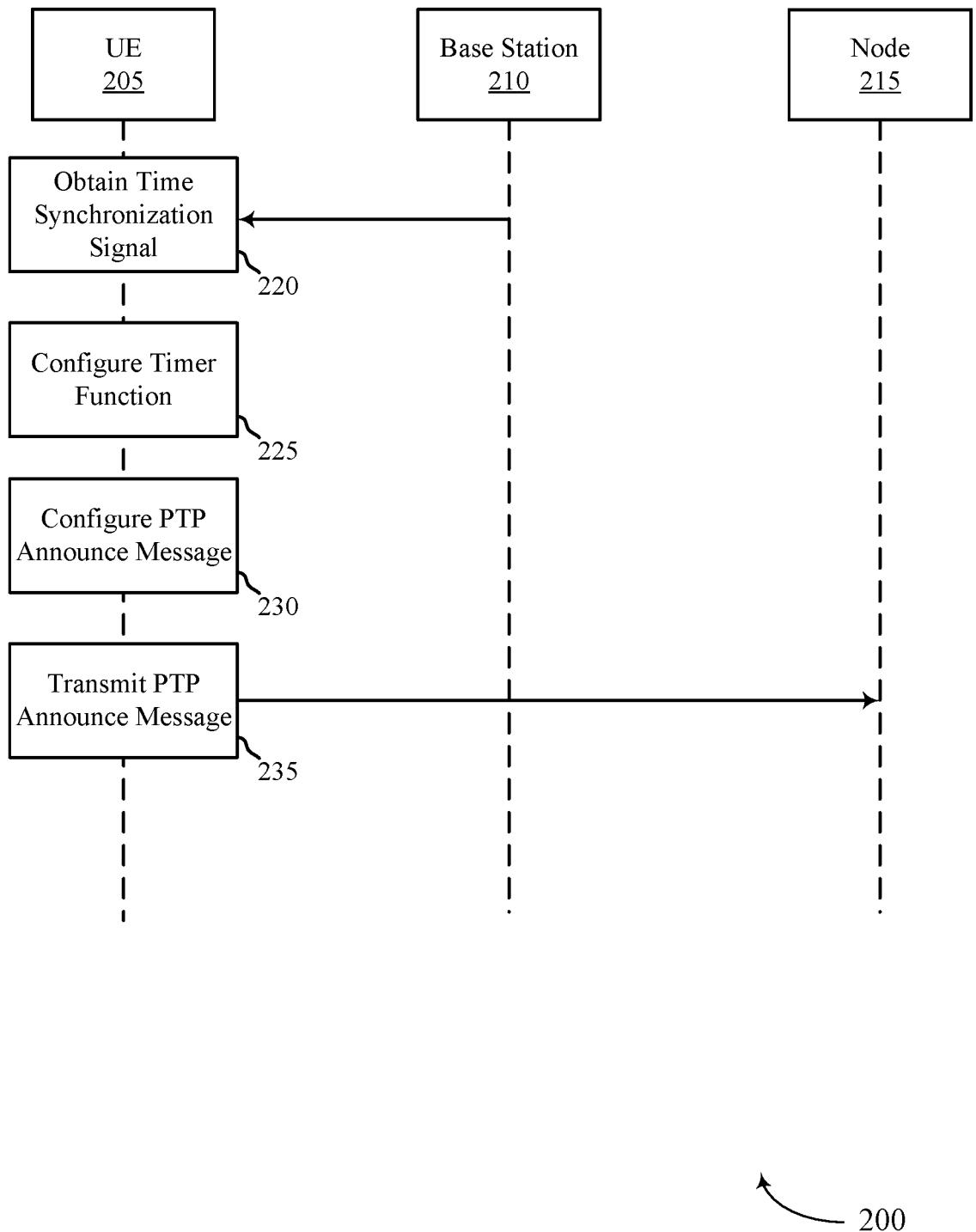
FIG. 2 illustrates an example of a process that supports the use of PTP with cellular networks. in accordance with aspects of the present disclosure.

FIG. 2 illustrates an example of a process 200 that supports the use of PTP with cellular networks, in accordance with various aspects of the present disclosure. In some examples, process 200 may implement aspects of wireless communications system 100. Process 200 may include a UE 205, a base station 210, and a node 215, which may be examples of the corresponding devices described herein.

Broadly, UE 205 may be configured to communicate on a wireless communication network (e.g., with base station 210) and to communicate on a local communication network (e.g., via Ethernet) to other nodes (e.g., node 215). In some aspects, a local communication network may generally refer to any non-cellular communication network, such as an Ethernet, a LAN, a Wi-Fi network, and the like, and may generally refer to a wired communication network, a wireless communication network, or a combination of both. UE 205 may obtain time synchronization from base station 210 (e.g., a eNB/gNB) over a cellular link and, in some examples, determine whether another PTP server exists on the local network with priority according to wireline PTP server. UE 205 may configure or run a PTP server if, in some examples, a wireline PTP server is not detected. UE 205 may configure parameter(s) for PTP announce message based on the cellular system and cellular link characteristics. In some aspects, references to PTP may refer to any suitable timer functionality operating on the local communication network, such as a precision clock synchronization protocol, e.g., generalized PTP (gPTP), Institute of Electrical and Electronic Engineers (IEEE) standard 802.1AS, IEEE1588 standard, and the like.

In some examples, UE 205 may select a priority (e.g., a grandmasterPriority1) parameter in the announce message to be a lower priority (larger value) than a grandmaster clock that obtains time synchronization over a local network. The UE 205 may select an accuracy field (e.g., a clockAccuracy) parameter in the announce message based on received signal strength, signal-to-interference-and-noise (SINR), the bandwidth of the synchronization signals, etc. The UE 205 may select a classification (e.g., clockClass) parameter in the announce message based on received signal strength, SINR, bandwidth of synchronization signals. The UE 205 may select a priority (e.g., grandmasterPriority2) in the announce message based on received signal strength and SINR at that UE 205 and/or at other UEs, and bandwidth of synchronization signals.

At 220, UE 205 may obtain timing synchronization signals from base station 210. UE 205 may obtain the timing synchronization signal over the cellular wireless communication link (e.g., over a LTE/LTE-A, NR, mmW, etc., wireless communication network). The timing synchronization signal may be obtained via message(s) received from base station 210. Example message(s) include synchronization signals (e.g., primary synchronization signal (PSS), secondary synchronization signal (SSS), system information messages (e.g., master information block (MIB)/system information block (SIB)), positioning signals (e.g., a positioning reference signal (PRS)), and/or other messages from base station 210. In some examples, UE 205 may obtain the timing synchronization signals from any combination of the messages/signals.

In some aspects, base station 210 may obtain the timing synchronization signals from a PTP server (e.g., a PTP server operating on an Ethernet and connected to base station 210 via the local communication network). In some aspects, base station 210 may obtain the timing synchronization signals from a global positioning system (GPS) receiver on base station 210.

At 225, UE 205 may configure a timer function. For example, UE 205 may use the timing synchronization signal obtained from base station 210 to configure the timer function of the UE 205. The configured timer function of the UE 205 may be or otherwise act as a PTP server, e.g., the UE 205 may be configured as a PTP server.

In some aspects, UE 205 may be configured with a PTP module that serves as the PTP server. The PTP module may generate and/or process PTP related packets. The PTP module may be a logically separate function and, in some examples, may be implemented in the cellular modem and/or Ethernet modem of UE 205.

In some aspects, UE 205 may configure the timer function based on a determination that there are no other PTP servers operating on the local communication network. For example, UE 205 may determine whether there are any active PTP servers operating on the Ethernet and, if not, configure the timer function. In other aspects, UE 205 may configure the timer function regardless of whether there are any other PTP servers on the local communication network.

At 230, UE 205 may configure a PTP announce message based on the timer function and, in some examples, metric(s) of the cellular wireless communication link. For example, the PTP announce message may be configured to carry or otherwise convey information indicating that the timing synchronization signal provided by the PTP server of UE 205 is based, at least in some aspects, on the cellular wireless communication network. Examples of the metrics of the cellular wireless communication network may include, but are not limited to, a SINR, a signal-to-noise (SNR), a received signal reference power (RSRP), a received signal reference quality (RSRQ), a bandwidth parameter, and/or a throughput parameter.

UE 205 may configure various parameters or fields of the PTP announce message. As one example, UE 205 may configure the PTP announce message by setting a grandmaster priority of the UE 205 to a priority value that is lower than a priority value associated with a second PTP server operating on the local communication network. For example, UE 205 may detect another PTP server operating on the Ethernet and, based on the detection, set the priority value to a value that establishes the PTP server of UE 205 as a secondary PTP server with respect to the other PTP server operating on the Ethernet. In some example, UE 205 may set the priority value to a low value regardless of whether there are other PTP server(s) operating on the Ethernet. In some examples, UE 205 may change its priority level indicated in the PTP announce message based on determining that another PTP server that was operating on the Ethernet is no longer operating, e.g., has gone offline, out of communication, etc. Accordingly, the PTP server of UE 205 may act as a backup PTP server.

In some aspects, UE 205 may set a field of the PTP announce message based on the metric(s) of the wireless communication network. For example, the metric(s) may satisfy a threshold (e.g., high SINR, high RSRP, etc.) and, based on the threshold being satisfied, UE 205 may configure a server accuracy field and/or a server class field of the PTP announce message.

In some aspects, UE 205 may configure a field of the PTP announce message to carry or otherwise convey information indicating that the timing synchronization signal is based, at least in part, on the wireless communication link. For example, UE 205 may configure a time source field of the PTP announce message to carry or convey the indication.

At 235, UE 205 may transmit the PTP announce message over the local communication network to node 215. For example, UE 205 may transmit the PTP announce message configured according to the timer function and wireless link metric(s) to device(s) (e.g., node 215) operating on the local network advertising that UE 205 is a PTP server. Device(s) (e.g., node 215) may receive the PTP announce message and, if a timing synchronization signal is needed, negotiate with UE 205 to receive a timing synchronization signal.

Figure 3:
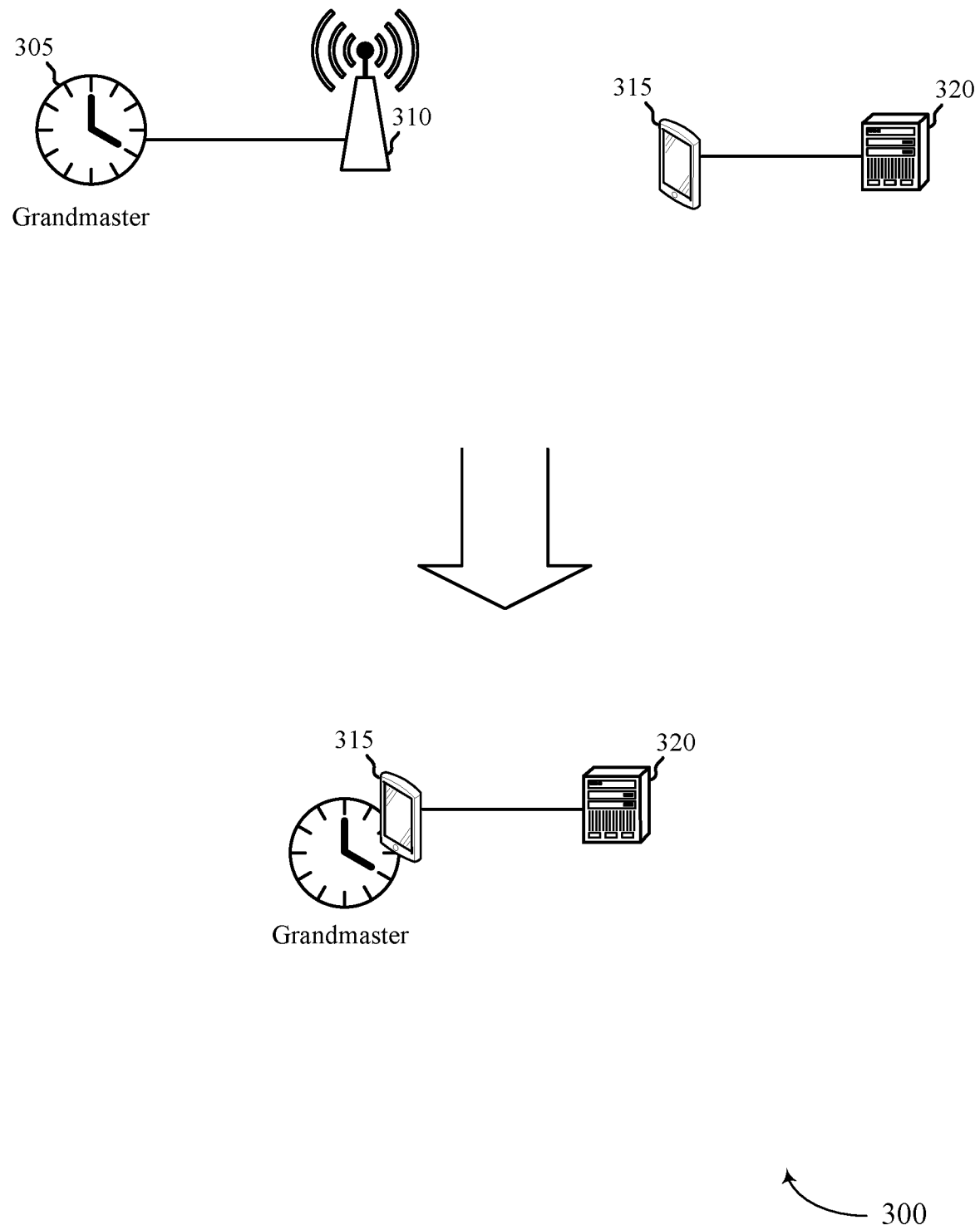
FIG. 3 illustrates an example of a network that supports the use of PTP with cellular networks. in accordance with aspects of the present disclosure.

FIG. 3 illustrates an example of a network 300 that supports the use of PTP with cellular networks. in accordance with various aspects of the present disclosure. In some examples, network 300 may implement aspects of wireless communications system 100 and/or process 200. Network 300 may include a PTP server 305, a base station 310, a UE 315, and a device 320, which may be examples of the corresponding devices described herein. In some aspects, the device 320 may refer to any device configured to communicate on a local communication network and may be synchronized according to PTP techniques, e.g., an industrial machine, a printing machine, and the like.

Generally, network 300 illustrates one example of UE 315 being configured to act as a PTP server (e.g., grandmaster clock) according to aspects of the described techniques. For example, UE 315 may receive or otherwise obtain a timing synchronization signal from base station 310 over a cellular wireless communication link. UE 315 may configure a timer function as a PTP server and provide a timing synchronization signal to device 320 over the local communication link. Accordingly, once UE 315 is configured as a PTP server (e.g., grandmaster clock), UE 315 may provide PTP timing synchronization signals over a local network to device 320.

In some aspects, UE 315 may configure a PTP announce message based on the timer function and, in some examples, metric(s) associated with the wireless communication link, e.g., channel propagation based parameters such as SINR, bandwidth, SNR, etc. The PTP announce message may include a priority level set such that UE 315 is a lower priority PTP server with respect to PTP server 305.

In some aspects, UE 315 configured as a PTP server (e.g., grandmaster clock) may include UE 315 transmitting various PTP related messages. For example, the parameters of the grandmaster clock may be shared along with the number of steps (e.g., hops) to the grandmaster clock. UE 315 may also configure PTP announce message parameters based on the cellular link, e.g., the accuracy and precision parameters which may be, in some aspects, influenced by the cellular link. Accordingly, UE 315 may configure the PTP announce message based on the metrics of the cellular link.

In some examples, UE 315 may configure a priority level for the PTP announce message (e.g., grandmasterPriority1) to a lower priority (larger value) than a grandmaster clock (e.g., PTP server 305) that is connected to a PTP system via a local network. In some examples, UE 315 may configure a clock quality field (e.g., grandmasterClockQuality) to clockClass 13, which may indicate a source for time synchronization, e.g., does UE 315 receive time from a primary reference time source over PTP. In some aspects, UE 315 may configure a clock accuracy field (clockAccuracy) of the PTP announce message to 23 or 24, which may indicate the accuracy level associated with the timing synchronization signal (which may depend on SINR of the cellular link, for example). In some aspects, UE 315 may configure a offset field of the PTP announce message (e.g., offsetScaledLogVariance) to a value selected based on the inherent precision of the timing synchronization signal, e.g., which may depend on the quality of clock or timer function in UE 315.

In some aspects, UE 315 may set the priority value to grandmasterPriority2 to indicate a high priority for UEs. As one example, a lower priority may be selected UE(s) which are known to have low SINR at their location. In some aspects, UE 315 may set a hop count field (e.g., stepsRemoved) to a value of 0 based on how many steps removed from grandmaster. In network 300, once UE 315 is configured as a PTP server, the hop count field may be set of 0. In some aspects, UE 315 may configure a source field of the PTP announce message (e.g., timeSource) to a value of 30, which indicates that the time synchronization is over a terrestrial radio, e.g., the cellular link.

It is to be understood that the described techniques are not limited to PTP techniques. For example, the described techniques may also be used in other timing protocols, such as process field net (PROFINET), generalized PTP (gPTP), or some other similar timing synchronization technique. PROFINET may provide similar functionality as PTP, but over layer 2 and using different encoding. The parameters associated with PROFINET techniques may have the same meaning and functionality, but may use different terminology. In some aspects, gPTP (e.g., IEEE 802.1AS) may use the same messages as PTP (e.g., IEEE 1588), however, gPTP may assume that communications are over IEEE 802 MAC PDUs (layer 2). PTP, on the other hand, may support layer 3-4 communication in addition to layer 2. gPTP may include two types of time aware systems: end stations and Bridges. An ordinary clock in PTP may correspond to an end station in gPTP. Accordingly, the field names described herein are exemplary only and may be different when used with other timing synchronization techniques.

Figure 4:
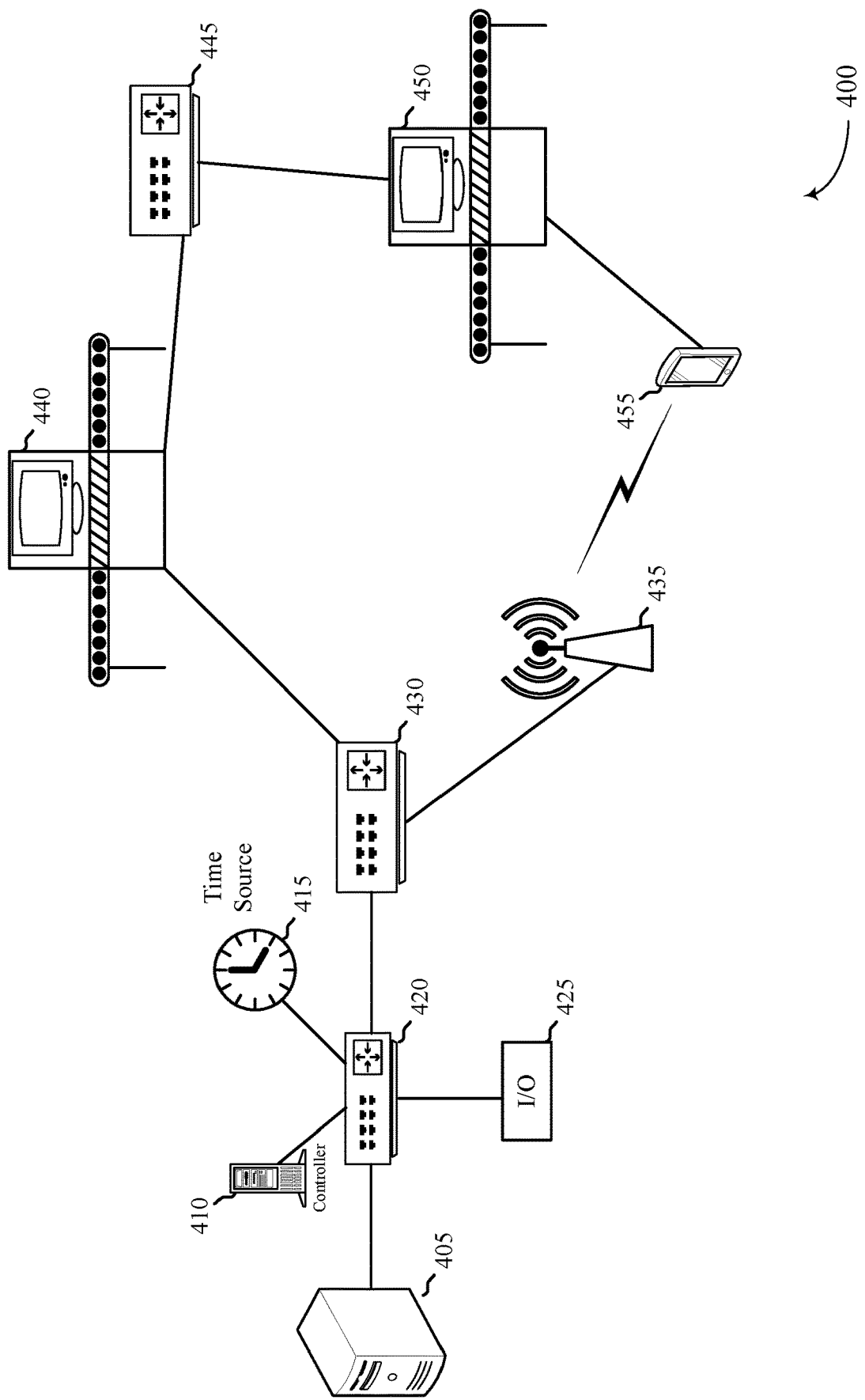
FIG. 4 illustrates an example of a network that supports the use of PTP with cellular networks. in accordance with aspects of the present disclosure.

FIG. 4 illustrates an example of a network 400 that supports the use of PTP with cellular networks. in accordance with various aspects of the present disclosure. In some examples, network 400 may implement aspects of wireless communications system 100, process 200, and/or network 300. Generally, network 400 provides one example of an end-to-end PTP service over a cellular system.

Network 400 may include a server 405, a controller 410, a PTP server 415, an Ethernet switch 420, and an input/output (I/O) 425 that are connected over a local communication network. The Ethernet switch 420 may be connected to another Ethernet switch 430, which may be connected to a base station 435 and a device 440. The PTP server 415 may generally provide timing synchronization signals for the components of the local communication network and to base station 435. Device 440 may refer to any device that uses timing synchronization protocols, such as PTP, e.g., any industrial and commercial device that relies on timing synchronization. Device 440 may also be connected to a third Ethernet switch 445, which may be connected to a second device 450. Device 450 may be connected to a UE 455 via the local communication network.

Generally, the PTP server 415 may act as a primary PTP server for the local communication network and provide timing synchronization signals to the components of the local communication network. Base station 435 may obtain timing synchronization signals from PTP server 415 and provide the timing synchronization signal to UE 455. UE 455 may be configured to communicate on both the local communication network and the wireless communication link. UE 455 may obtain the timing synchronization signals from base station 435 and configure a timer function of the UE as a PTP server. The PTP server of the UE 455 may have a priority level that is lower with respect to a priority level of the PTP server 415. UE 455 may configure a PTP announce message based on the timer function and, in some examples, based on the metric(s) associated with the wireless link, e.g., SINR, bandwidth, throughput, channel quality, etc.

Generally, the end-to-end PTP features illustrated in network 400 may use a variety of options to provide PTP service. In a first option, the cellular system may act as an Ethernet switch. For example, the PTP packets may be identified (Synchronization, Delay_Req messages) and be prioritized for transmission. The PTP packets may be delayed through the cellular link based on the time spent in the core network (e.g., queuing and/or processing), time spent at base station 435 (e.g., scheduling, queuing, etc.), the time over the air link (e.g., propagation delay, re-transmissions, etc.), and the like. In some aspects, the delay in the system may not be measured, and therefore, the overall jitter may determine the performance.

In a second option, the cellular system may act as a transparent clock. For example, the PTP packets may be identified and their residence time may be measured. The measured residence time may be added to the correction field in a PTP message. The delays may be similar to those discussed in option 1. Although the residence time may be measured, jitter due to re-transmissions cannot be removed and UE 455 may compensate. However, in some aspects the residence time at base station 435 may be an important aspect and may need PTP message identification, e.g., may need to have a field of the PTP message configured to indicate the residence time. The resident time may be measured in base station 435 hardware, but the PTP message may be updated at protocol data unit (PDU) session layer, which may include tight integration of processing across layers.

In a third option, UE 455 may be configured to act as a PTP clock. UE 455 may receive time from the grandmaster clock (e.g., PTP server 415) connected to base station 435 and, after performing time synchronization using cellular signaling, configure a timer function to act as a grandmaster clock. Accordingly, the clock configuration may be based on the air link between base station 435 and UE 455.

Accordingly, in the situation where a component of the local communication network fails (e.g., Ethernet cable connecting Ethernet switch 430 and Ethernet switch 440), UE 455 may determine that there is no other time source on and start a PTP server according to aspects of the described techniques.

Figure 5:
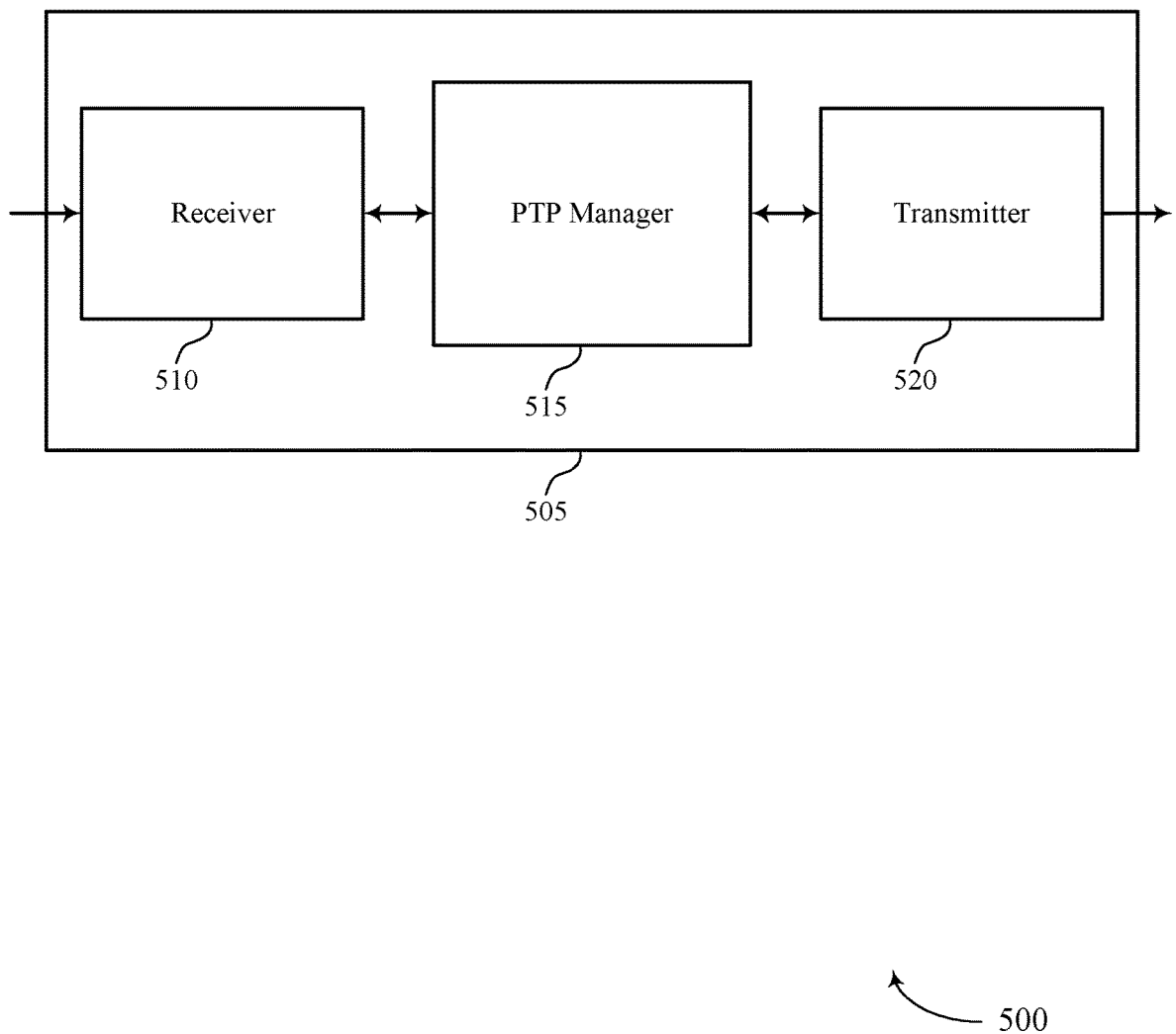
FIGS. 5 through 7 show block diagrams of a device that supports the use of PTP with cellular networks. in accordance with aspects of the present disclosure.

FIG. 5 shows a block diagram 500 of a wireless device 505 that supports the use of PTP with cellular networks. in accordance with aspects of the present disclosure. Wireless device 505 may be an example of aspects of a UE 115 as described herein. Wireless device 505 may include receiver 510, PTP manager 515, and transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, and information related to PTP, etc.). Information may be passed on to other components of the device. The receiver 510 may be an example of aspects of the transceiver 835 described with reference to FIG. 8. The receiver 510 may utilize a single antenna or a set of antennas.

PTP manager 515 may be an example of aspects of the PTP manager 815 described with reference to FIG. 8.

PTP manager 515 and/or at least some of its various sub-components may be implemented in hardware, software executed by a processor, firmware, or any combination thereof. If implemented in software executed by a processor, the functions of the PTP manager 515 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The PTP manager 515 and/or at least some of its various sub-components may be physically located at various positions, including being distributed such that portions of functions are implemented at different physical locations by one or more physical devices. In some examples, PTP manager 515 and/or at least some of its various sub-components may be a separate and distinct component in accordance with various aspects of the present disclosure. In other examples, PTP manager 515 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

PTP manager 515 may obtain a timing synchronization signal from a base station over a cellular wireless communication link. PTP manager 515 may configure, based on the timing synchronization signal, a timer function of the UE as a PTP server. PTP manager 515 may configure a PTP announce message based on the timer function and, optionally, one or more metrics of the cellular wireless communication link. PTP manager 515 may transmit the PTP announce message over a local communication network.

Transmitter 520 may transmit signals generated by other components of the device. In some examples, the transmitter 520 may be collocated with a receiver 510 in a transceiver module. For example, the transmitter 520 may be an example of aspects of the transceiver 835 described with reference to FIG. 8. The transmitter 520 may utilize a single antenna or a set of antennas.

Figure 6:
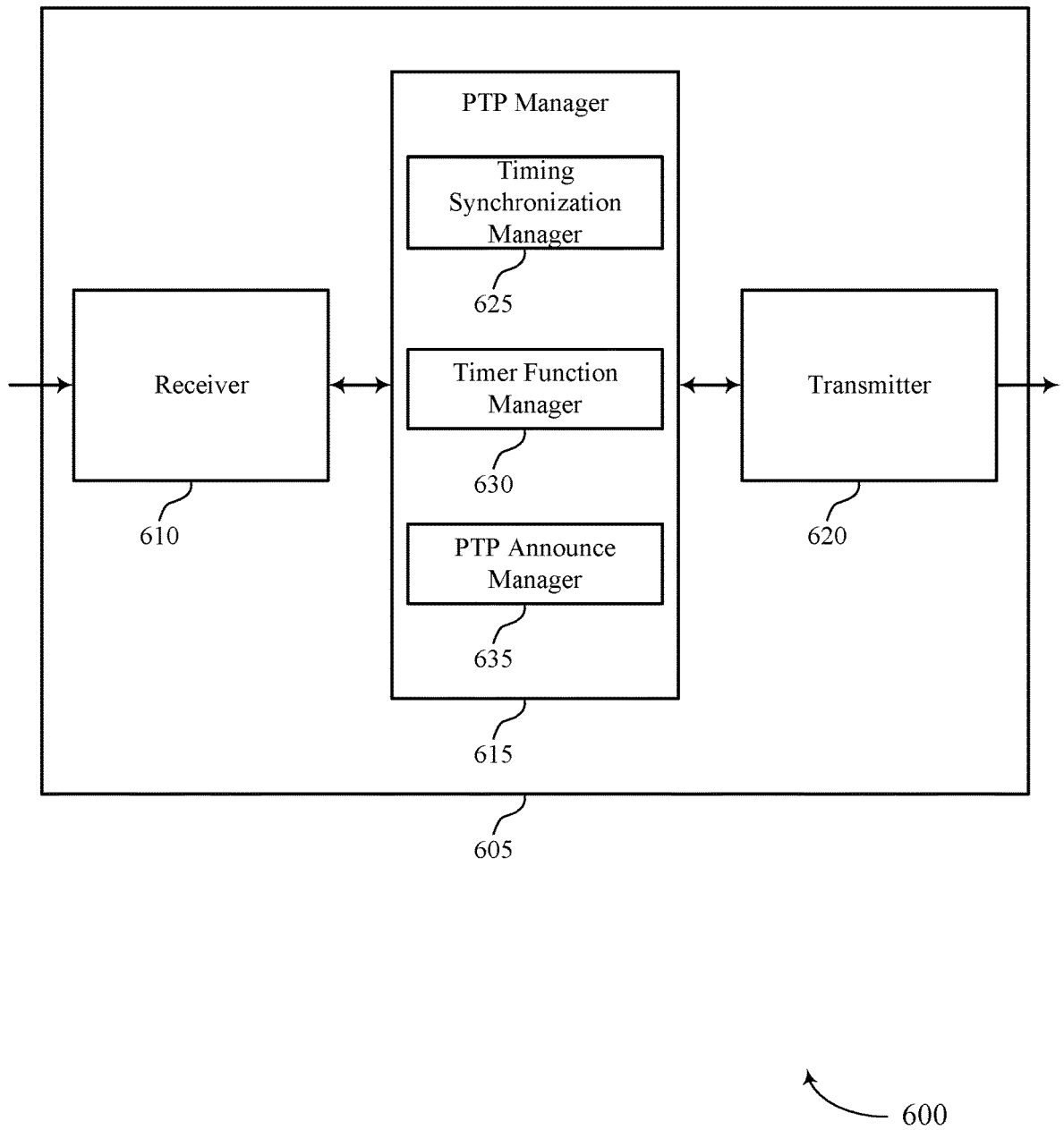

FIG. 6 shows a block diagram 600 of a wireless device 605 that supports the use of PTP with cellular networks. in accordance with aspects of the present disclosure. Wireless device 605 may be an example of aspects of a wireless device 505 or a UE 115 as described herein. Wireless device 605 may include receiver 610, PTP manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to the use of PTP with cellular networks, etc.). Information may be passed on to other components of the device. The receiver 610 may be an example of aspects of the transceiver 835 described with reference to FIG. 8. The receiver 610 may utilize a single antenna or a set of antennas.

PTP manager 615 may be an example of aspects of the PTP manager 815 described with reference to FIG. 8. PTP manager 615 may also include timing synchronization manager 625, timer function manager 630, and PTP announce manager 635.

Timing synchronization manager 625 may obtain, by a UE, a timing synchronization signal from a base station over a cellular wireless communication link.

Timer function manager 630 may configure, based on the timing synchronization signal, a timer function of the UE as a PTP server.

PTP announce manager 635 may configure a PTP announce message based on the timer function and, in some examples, one or more metrics of the cellular wireless communication link. PTP announce manager 635 may transmit the PTP announce message over a local communication network. PTP announce manager 635 may configure at least one of: a server accuracy field of the PTP announce message or a server class field of the PTP announce message based on the determination. PTP announce manager 635 may configure a time source field of the PTP announce message to indicate that the timing synchronization signal is based on the cellular wireless communication link. In some cases, configuring the PTP announce message includes: setting a grandmaster priority of the UE to a priority value that is lower than a priority value associated with a second PTP server operating on the local communication network. In some cases, configuring the PTP announce message includes: determining that at least one of the one or more metrics of the cellular wireless communication link satisfies a threshold. In some cases, the metrics of the cellular wireless communication link include at least one of: a RSRP, a SNR, a SINR, a RSRQ, a bandwidth parameter, a throughput parameter, or a combination thereof.

Transmitter 620 may transmit signals generated by other components of the device. In some examples, the transmitter 620 may be collocated with a receiver 610 in a transceiver module. For example, the transmitter 620 may be an example of aspects of the transceiver 835 described with reference to FIG. 8. The transmitter 620 may utilize a single antenna or a set of antennas.

Figure 7:
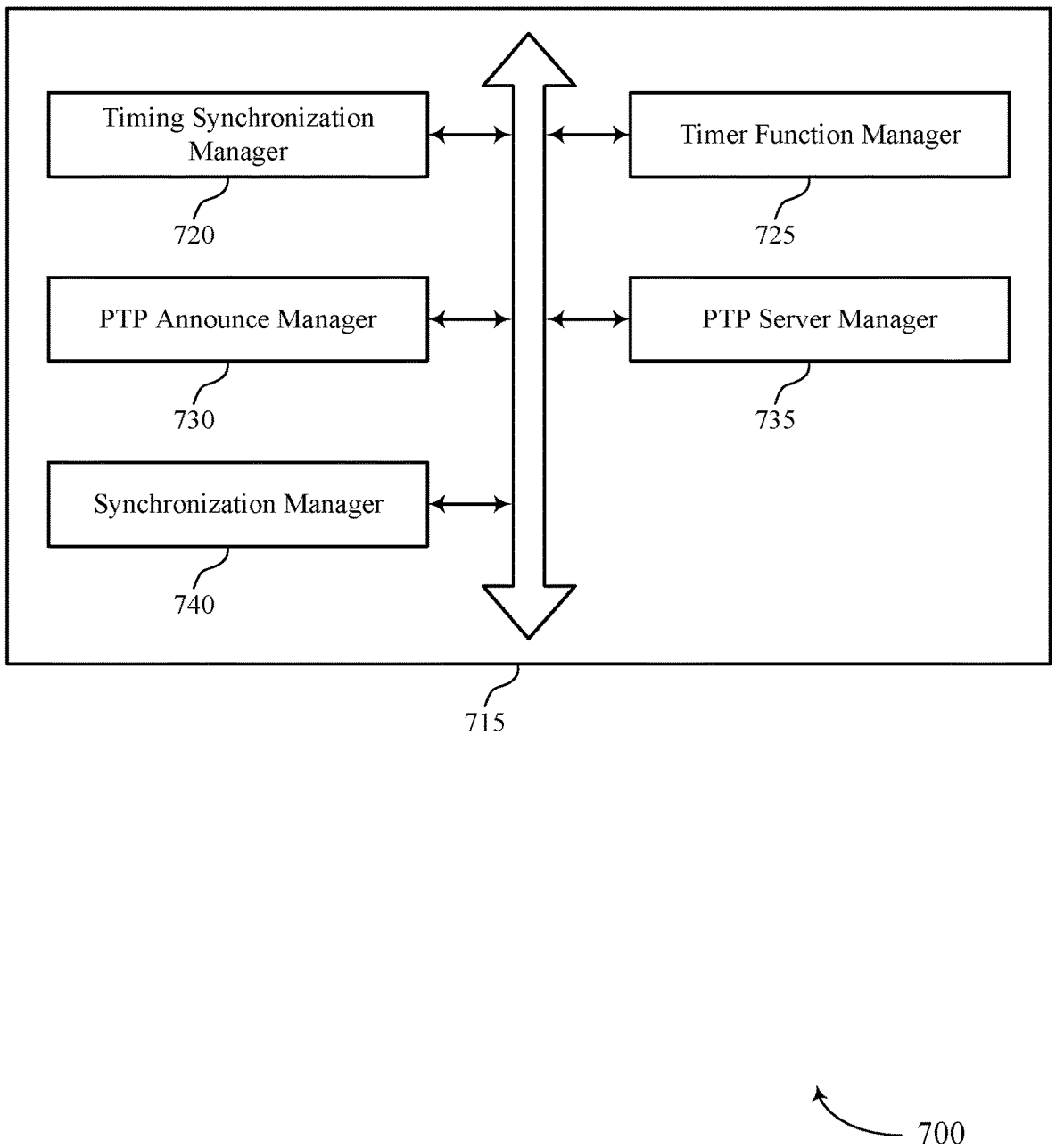

FIG. 7 shows a block diagram 700 of a PTP manager 715 that supports the use of PTP with cellular networks. in accordance with aspects of the present disclosure. The PTP manager 715 may be an example of aspects of a PTP manager 515, a PTP manager 615, or a PTP manager 815 described with reference to FIGS. 5, 6, and 8. The PTP manager 715 may include timing synchronization manager 720, timer function manager 725, PTP announce manager 730, PTP server manager 735, and synchronization manager 740. Each of these modules may communicate, directly or indirectly, with one another (e.g., via one or more buses).

Timing synchronization manager 720 may obtain, by a UE, a timing synchronization signal from a base station over a cellular wireless communication link.

Timer function manager 725 may configure, based on the timing synchronization signal, a timer function of the UE as a PTP server.

PTP announce manager 730 may configure a PTP announce message based on the timer function and, in some instances, one or more metrics of the cellular wireless communication link. PTP announce manager 730 may transmit the PTP announce message over a local communication network. PTP announce manager 730 may configure at least one of: a server accuracy field of the PTP announce message or a server class field of the PTP announce message based on the determination. PTP announce manager 730 may configure a time source field of the PTP announce message to indicate that the timing synchronization signal is based on the cellular wireless communication link. In some cases, configuring the PTP announce message includes: setting a grandmaster priority of the UE to a priority value that is lower than a priority value associated with a second PTP server operating on the local communication network. In some cases, configuring the PTP announce message includes: determining that at least one of the one or more metrics of the cellular wireless communication link satisfies a threshold. In some cases, the metrics of the cellular wireless communication link include at least one of: a RSRP, a SNR, a SINR, a RSRQ, a bandwidth parameter, a throughput parameter, or a combination thereof.

PTP server manager 735 may determine that no other PTP server exists on the local communication network and configure the timer function of the UE as a PTP server is in response to the determination.

Synchronization manager 740 may provide a timing signal over the local communication network according to the timer function of the UE. Synchronization manager 740 may obtain the timing synchronization signal from the base station using at least one of: a primary synchronization signal, a secondary synchronization signal, a system information block, a positioning reference signal, or any combination thereof. Synchronization manager 740 may synchronize a cellular mode timer of the UE based at least in part on a timing signal obtained over the local communication network.

Figure 8:
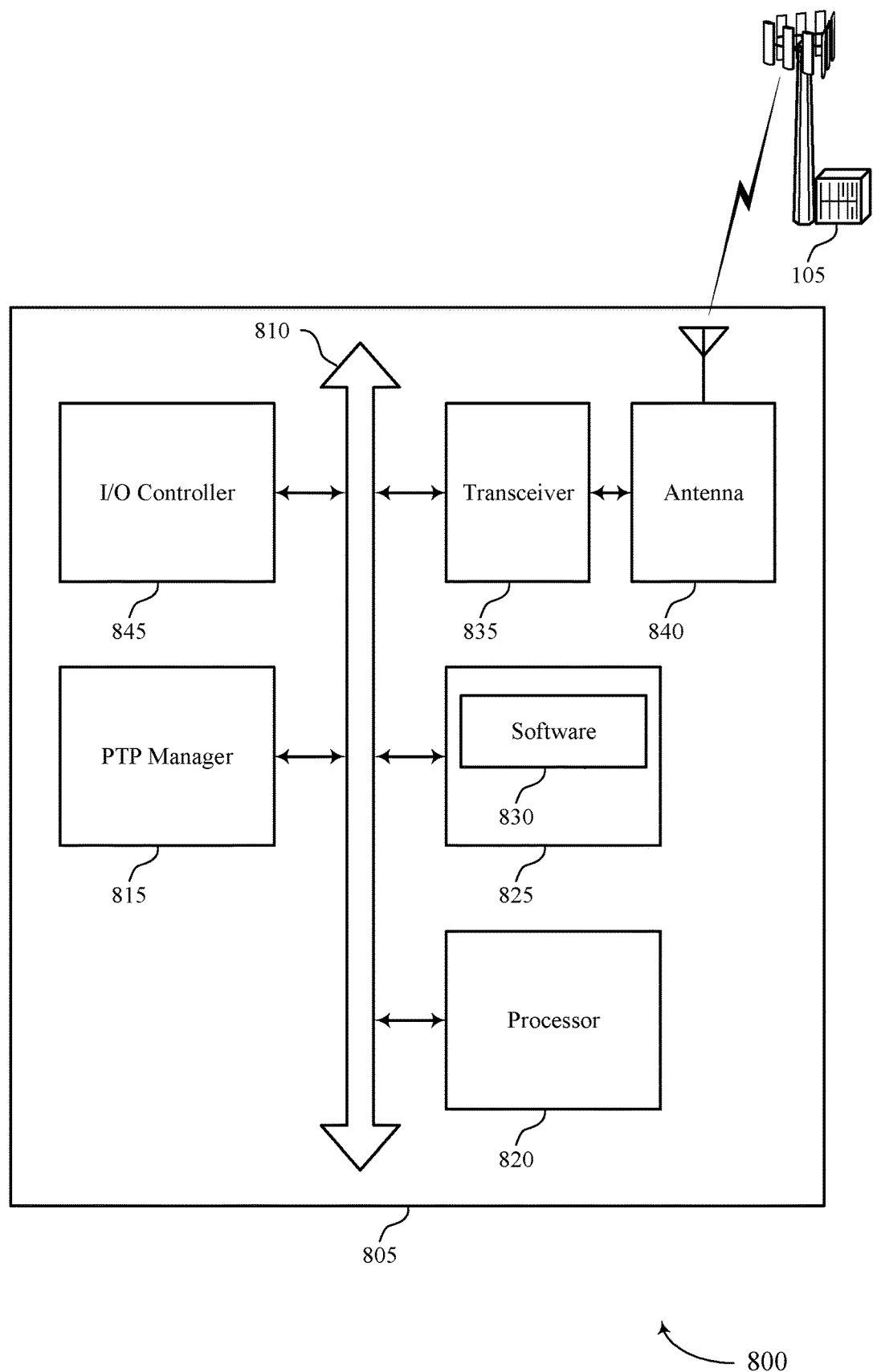
FIG. 8 illustrates a block diagram of a system including a UE that supports the use of PTP with cellular networks. in accordance with aspects of the present disclosure.

FIG. 8 shows a diagram of a system 800 including a device 805 that supports the use of PTP with cellular networks. in accordance with aspects of the present disclosure. Device 805 may be an example of or include the components of wireless device 505, wireless device 605, or a UE 115 as described herein. Device 805 may include components for bi-directional voice and data communications including components for transmitting and receiving communications, including PTP manager 815, processor 820, memory 825, software 830, transceiver 835, antenna 840, and I/O controller 845. These components may be in electronic communication via one or more buses (e.g., bus 810). Device 805 may communicate wirelessly with one or more base stations 105.

Processor 820 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 820 may be configured to operate a memory array using a memory controller. In other cases, a memory controller may be integrated into processor 820. Processor 820 may be configured to execute computer-readable instructions stored in a memory to perform various functions (e.g., functions or tasks supporting the use of PTP with cellular networks.).

Memory 825 may include random access memory (RAM) and read only memory (ROM). The memory 825 may store computer-readable, computer-executable software 830 including instructions that, when executed, cause the processor to perform various functions described herein. In some cases, the memory 825 may contain, among other things, a basic input/output system (BIOS) which may control basic hardware or software operation such as the interaction with peripheral components or devices.

Software 830 may include code to implement aspects of the present disclosure, including code to support the use of PTP with cellular networks. Software 830 may be stored in a non-transitory computer-readable medium such as system memory or other memory. In some cases, the software 830 may not be directly executable by the processor but may cause a computer (e.g., when compiled and executed) to perform functions described herein.

Transceiver 835 may communicate bi-directionally, via one or more antennas, wired, or wireless links as described above. For example, the transceiver 835 may represent a wireless transceiver and may communicate bi-directionally with another wireless transceiver. The transceiver 835 may also include a modem to modulate the packets and provide the modulated packets to the antennas for transmission, and to demodulate packets received from the antennas.

In some cases, the wireless device may include a single antenna 840. However, in some cases the device may have more than one antenna 840, which may be capable of concurrently transmitting or receiving multiple wireless transmissions.

I/O controller 845 may manage input and output signals for device 805. I/O controller 845 may also manage peripherals not integrated into device 805. In some cases, I/O controller 845 may represent a physical connection or port to an external peripheral. In some cases, I/O controller 845 may utilize an operating system such as iOS®, ANDROID®, MS-DOS®, MS-WINDOWS®, OS/2®, UNIX®, LINUX®, or another known operating system. In other cases, I/O controller 845 may represent or interact with a modem, a keyboard, a mouse, a touchscreen, or a similar device. In some cases, I/O controller 845 may be implemented as part of a processor. In some cases, a user may interact with device 805 via I/O controller 845 or via hardware components controlled by I/O controller 845.

Figure 9:
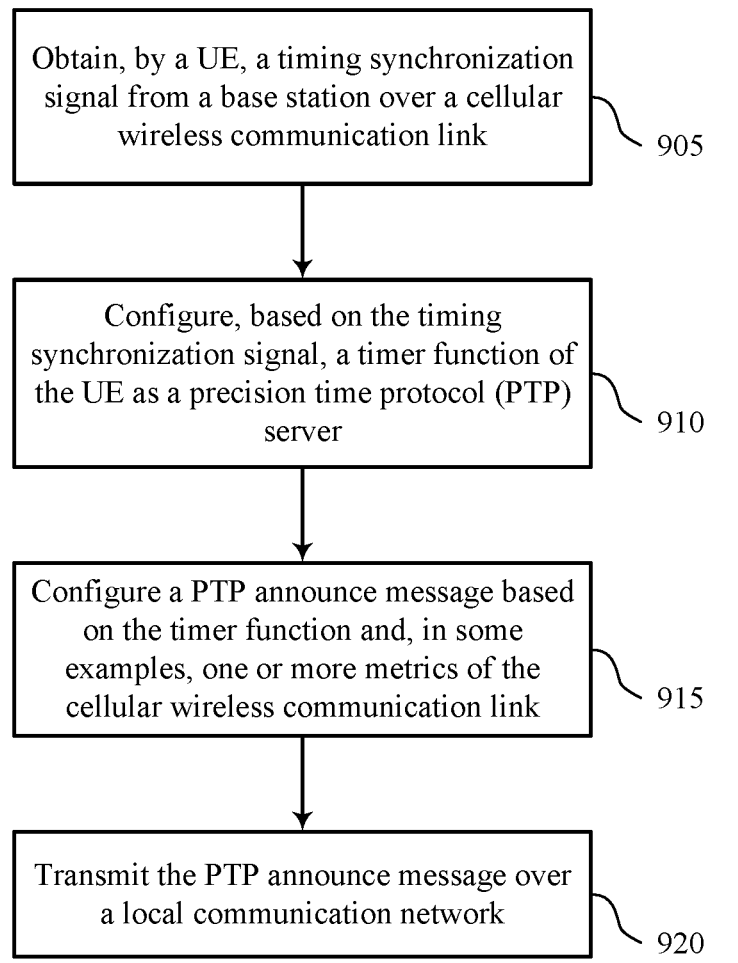
FIGS. 9 through 11 illustrate methods for the use of PTP with cellular networks. in accordance with aspects of the present disclosure.

FIG. 9 shows a flowchart illustrating a method 900 for the use of PTP with cellular networks. in accordance with aspects of the present disclosure. The operations of method 900 may be implemented by a UE 115 or its components as described herein. For example, the operations of method 900 may be performed by a PTP manager as described with reference to FIGS. 5 through 8. In some examples, a UE 115 may execute a set of codes to control the functional elements of the device to perform the functions described below. Additionally or alternatively, the UE 115 may perform aspects of the functions described below using special-purpose hardware.

At block 905 the UE 115 may obtain, by a UE, a timing synchronization signal from a base station over a cellular wireless communication link. The operations of block 905 may be performed according to the methods described herein. In certain examples, aspects of the operations of block 905 may be performed by a timing synchronization manager as described with reference to FIGS. 5 through 8.

At block 910 the UE 115 may configure, based at least in part on the timing synchronization signal, a timer function of the UE as a PTP server. The operations of block 910 may be performed according to the methods described herein. In certain examples, aspects of the operations of block 910 may be performed by a timer function manager as described with reference to FIGS. 5 through 8.

At block 915 the UE 115 may configure a PTP announce message based on the timer function and, in some examples, one or more metrics of the cellular wireless communication link. The operations of block 915 may be performed according to the methods described herein. In certain examples, aspects of the operations of block 915 may be performed by a PTP announce manager as described with reference to FIGS. 5 through 8.

At block 920 the UE 115 may transmit the PTP announce message over a local communication network. The operations of block 920 may be performed according to the methods described herein. In certain examples, aspects of the operations of block 920 may be performed by a PTP announce manager as described with reference to FIGS. 5 through 8.

Figure 10:
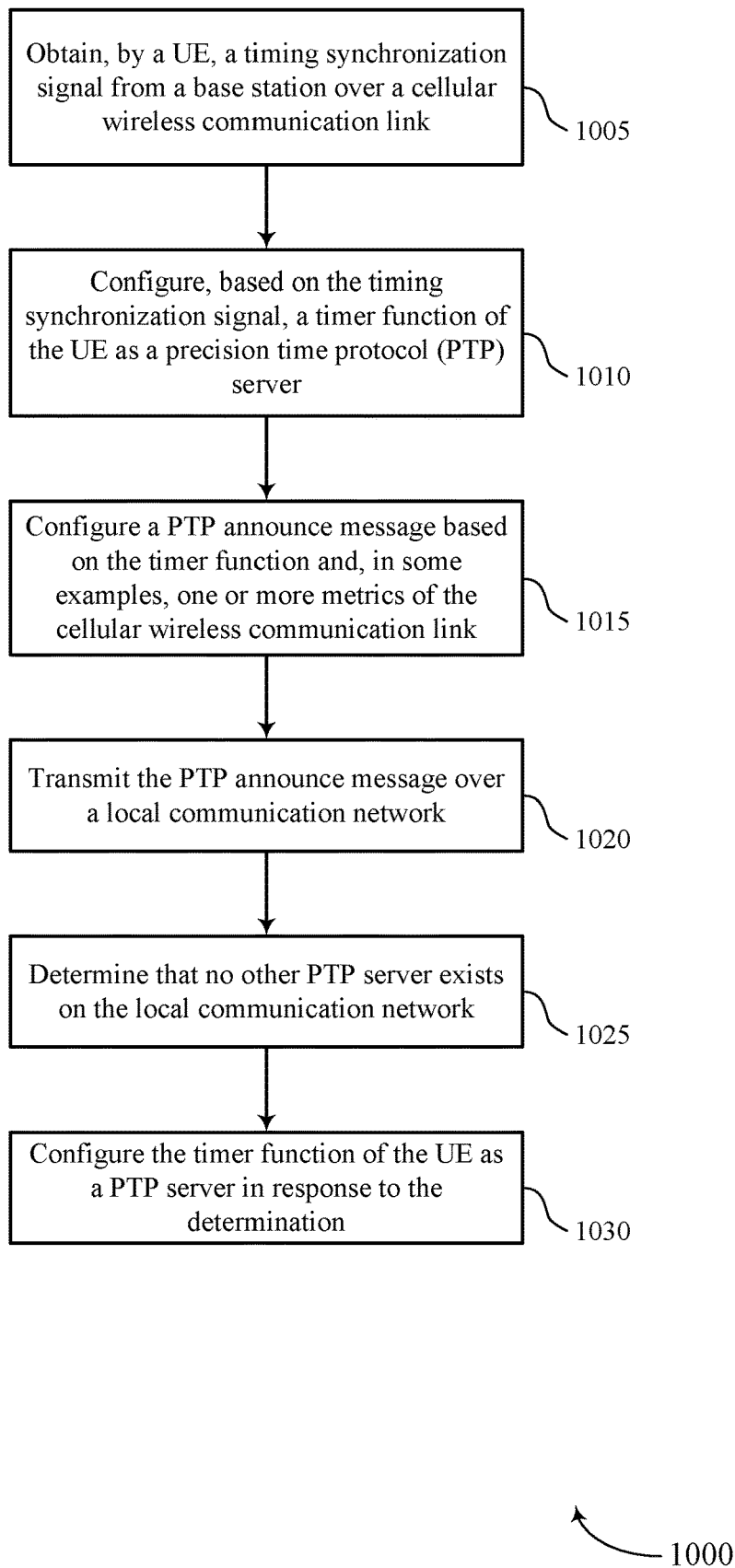

FIG. 10 shows a flowchart illustrating a method 1000 for the use of PTP with cellular networks. in accordance with aspects of the present disclosure. The operations of method 1000 may be implemented by a UE 115 or its components as described herein. For example, the operations of method 1000 may be performed by a PTP manager as described with reference to FIGS. 5 through 8. In some examples, a UE 115 may execute a set of codes to control the functional elements of the device to perform the functions described below. Additionally or alternatively, the UE 115 may perform aspects of the functions described below using special-purpose hardware.

At block 1005 the UE 115 may obtain, by a UE, a timing synchronization signal from a base station over a cellular wireless communication link. The operations of block 1005 may be performed according to the methods described herein. In certain examples, aspects of the operations of block 1005 may be performed by a timing synchronization manager as described with reference to FIGS. 5 through 8.

At block 1010 the UE 115 may configure, based at least in part on the timing synchronization signal, a timer function of the UE as a PTP server. The operations of block 1010 may be performed according to the methods described herein. In certain examples, aspects of the operations of block 1010 may be performed by a timer function manager as described with reference to FIGS. 5 through 8.

At block 1015 the UE 115 may configure a PTP announce message based on the timer function and, in some examples, one or more metrics of the cellular wireless communication link. The operations of block 1015 may be performed according to the methods described herein. In certain examples, aspects of the operations of block 1015 may be performed by a PTP announce manager as described with reference to FIGS. 5 through 8.

At block 1020 the UE 115 may transmit the PTP announce message over a local communication network. The operations of block 1020 may be performed according to the methods described herein. In certain examples, aspects of the operations of block 1020 may be performed by a PTP announce manager as described with reference to FIGS. 5 through 8.

At block 1025 the UE 115 may determine that no other PTP server exists on the local communication network. The operations of block 1025 may be performed according to the methods described herein. In certain examples, aspects of the operations of block 1025 may be performed by a PTP server manager as described with reference to FIGS. 5 through 8.

At block 1030 the UE 115 may configure the timer function of the UE as a PTP server is in response to the determination. The operations of block 1030 may be performed according to the methods described herein. In certain examples, aspects of the operations of block 1030 may be performed by a PTP server manager as described with reference to FIGS. 5 through 8.

Figure 11:
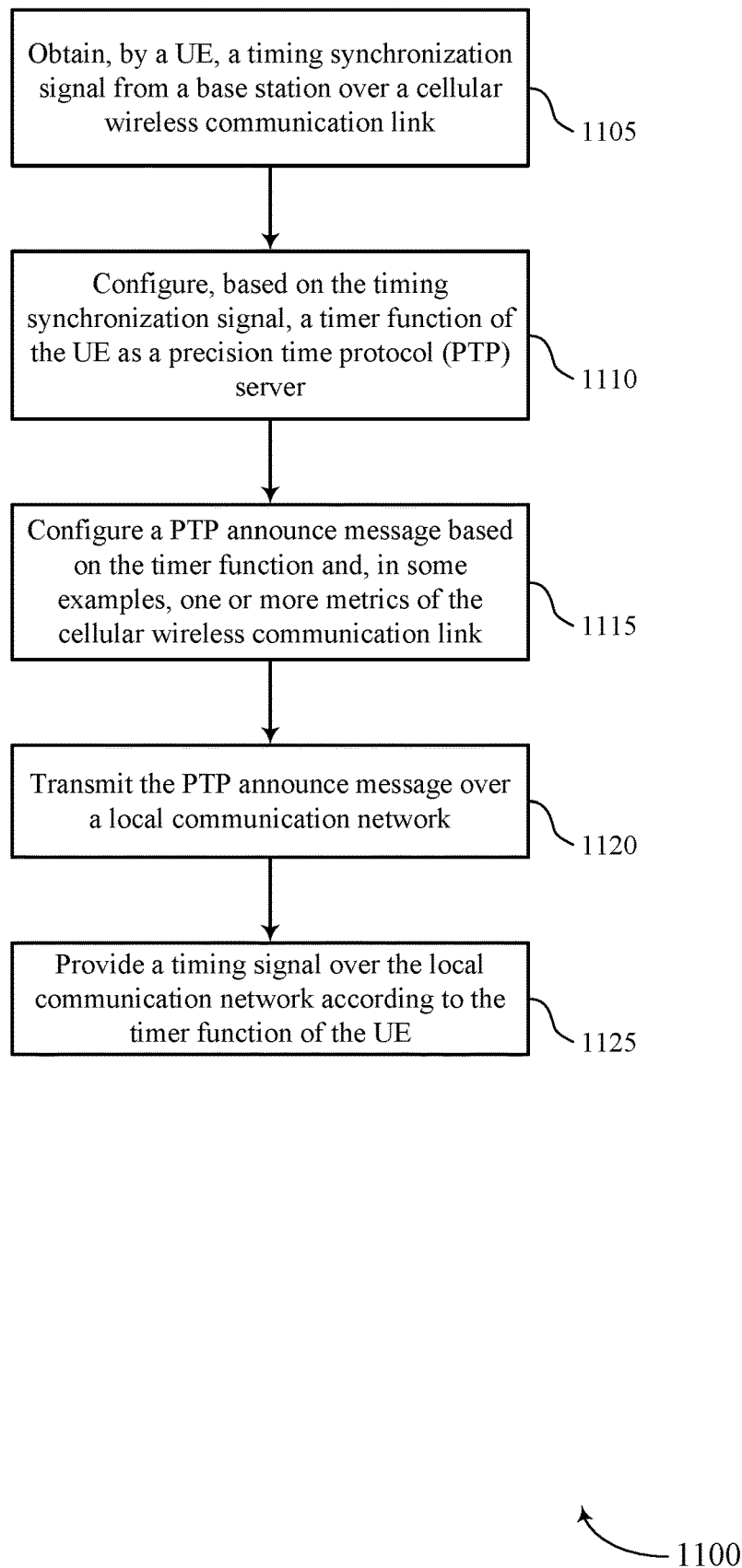

FIG. 11 shows a flowchart illustrating a method 1100 for the use of PTP with cellular networks. in accordance with aspects of the present disclosure. The operations of method 1100 may be implemented by a UE 115 or its components as described herein. For example, the operations of method 1100 may be performed by a PTP manager as described with reference to FIGS. 5 through 8. In some examples, a UE 115 may execute a set of codes to control the functional elements of the device to perform the functions described below. Additionally or alternatively, the UE 115 may perform aspects of the functions described below using special-purpose hardware.

At block 1105 the UE 115 may obtain, by a UE, a timing synchronization signal from a base station over a cellular wireless communication link. The operations of block 1105 may be performed according to the methods described herein. In certain examples, aspects of the operations of block 1105 may be performed by a timing synchronization manager as described with reference to FIGS. 5 through 8.

At block 1110 the UE 115 may configure, based at least in part on the timing synchronization signal, a timer function of the UE as a PTP server. The operations of block 1110 may be performed according to the methods described herein. In certain examples, aspects of the operations of block 1110 may be performed by a timer function manager as described with reference to FIGS. 5 through 8.

At block 1115 the UE 115 may configure a PTP announce message based on the timer function and, in some examples, one or more metrics of the cellular wireless communication link. The operations of block 1115 may be performed according to the methods described herein. In certain examples, aspects of the operations of block 1115 may be performed by a PTP announce manager as described with reference to FIGS. 5 through 8.

At block 1120 the UE 115 may transmit the PTP announce message over a local communication network. The operations of block 1120 may be performed according to the methods described herein. In certain examples, aspects of the operations of block 1120 may be performed by a PTP announce manager as described with reference to FIGS. 5 through 8.

At block 1125 the UE 115 may provide a timing signal over the local communication network according to the timer function of the UE. The operations of block 1125 may be performed according to the methods described herein. In certain examples, aspects of the operations of block 1125 may be performed by a synchronization manager as described with reference to FIGS. 5 through 8.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of eNBs provide coverage for various geographical regions. For example, each eNB, next generation NodeB (gNB), or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), gNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 of FIG. 1—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
    obtaining, by a user equipment (UE), a timing synchronization signal from a base station over a cellular wireless communication link;
    configuring, based at least in part on the timing synchronization signal, a timer function of the UE as a precision time protocol (PTP) server;
    configuring a PTP announce message based on the timer function;
    configuring a time source field of the PTP announce message to indicate that the timing synchronization signal is based on the cellular wireless communication link; and
    transmitting the PTP announce message over a local communication network.

2. The method of claim 1, further comprising:
    determining that no other PTP server exists on the local communication network; and
    configuring the timer function of the UE as the PTP server is in response to the determination.

3. The method of claim 1, wherein:
    configuring the PTP announce message comprises: setting a grandmaster priority of the UE to a priority value that is lower than a priority value associated with a second PTP server operating on the local communication network.

4. The method of claim 1, further comprising:
    providing a timing signal over the local communication network according to the timer function of the UE.

5. The method of claim 1, wherein:
    configuring the PTP announce message comprises: determining that at least one of one or more metrics of the cellular wireless communication link satisfies a threshold; and
    the method further comprising configuring at least one of: a server accuracy field of the PTP announce message or a server class field of the PTP announce message based at least in part on the determination.

6. The method of claim 1, wherein:
    configuring the PTP announce message is further based at least in part on one or more metrics of the cellular wireless communication link, and wherein the metrics of the cellular wireless communication link comprise at least one of: a received signal reference power (RSRP), a signal-to-noise ratio (SNR), a signal-to-interference-and-noise ratio (SINK), a received signal reference quality (RSRQ), a bandwidth parameter, a throughput parameter, or a combination thereof.

7. The method of claim 1, further comprising:
    obtaining the timing synchronization signal from the base station using at least one of: a primary synchronization signal, a secondary synchronization signal, a system information block, a positioning reference signal, or any combination thereof.

8. The method of claim 1, further comprising:
    synchronizing a cellular modem timer of the UE based at least in part on a timing signal obtained over the local communication network.

9. An apparatus for wireless communication, comprising:
    means for obtaining, by a user equipment (UE), a timing synchronization signal from a base station over a cellular wireless communication link;
    means for configuring, based at least in part on the timing synchronization signal, a timer function of the UE as a precision time protocol (PTP) server;
    means for configuring a PTP announce message based on the timer function and one or more metrics of the cellular wireless communication link;
    means for configuring a time source field of the PTP announce message to indicate that the timing synchronization signal is based on the cellular wireless communication link; and
    means for transmitting the PTP announce message over a local communication network.

10. The apparatus of claim 9, further comprising:
    means for determining that no other PTP server exists on the local communication network; and
    means for configuring the timer function of the UE as the PTP server is in response to the determination.

11. The apparatus of claim 9, wherein:
    configuring the PTP announce message comprises: setting a grandmaster priority of the UE to a priority value that is lower than a priority value associated with a second PTP server operating on the local communication network.

12. The apparatus of claim 9, further comprising:
    means for providing a timing signal over the local communication network according to the timer function of the UE.

13. The apparatus of claim 9, wherein:
    configuring the PTP announce message comprises: determining that at least one of the one or more metrics of the cellular wireless communication link satisfies a threshold; and
    the apparatus further comprising means for configuring at least one of: a server accuracy field of the PTP announce message or a server class field of the PTP announce message based at least in part on the determination.

14. The apparatus of claim 9, wherein:
the metrics of the cellular wireless communication link comprise at least one of: a received signal reference power (RSRP), a signal-to-noise ratio (SNR), a signal-to-interference-and-noise ratio (SINR), a received signal reference quality (RSRQ), a bandwidth parameter, a throughput parameter, or a combination thereof.

15. The apparatus of claim 9, further comprising:
means for obtaining the timing synchronization signal from the base station using at least one of: a primary synchronization signal, a secondary synchronization signal, a system information block, a positioning reference signal, or any combination thereof.

16. An apparatus for wireless communication, comprising:
a processor;
memory in electronic communication with the processor; and
instructions stored in the memory and operable, when executed by the processor, to cause the apparatus to:
obtain, by a user equipment (UE), a timing synchronization signal from a base station over a cellular wireless communication link;
configure, based at least in part on the timing synchronization signal, a timer function of the UE as a precision time protocol (PTP) server;
configure a PTP announce message based on the timer function and one or more metrics of the cellular wireless communication link;
configure a time source field of the PTP announce message to indicate that the timing synchronization signal is based on the cellular wireless communication link; and
transmit the PTP announce message over a local communication network.

17. The apparatus of claim 16, wherein the instructions are further executable by the processor to:
determine that no other PTP server exists on the local communication network; and
configure the timer function of the UE as the PTP server is in response to the determination.

18. The apparatus of claim 16, wherein:
configuring the PTP announce message comprises: setting a grandmaster priority of the UE to a priority value that is lower than a priority value associated with a second PTP server operating on the local communication network.

* * * * *